July 29, 1941.  C. H. JENSEN  2,251,189
CABLE CONNECTOR
Filed Feb. 28, 1941
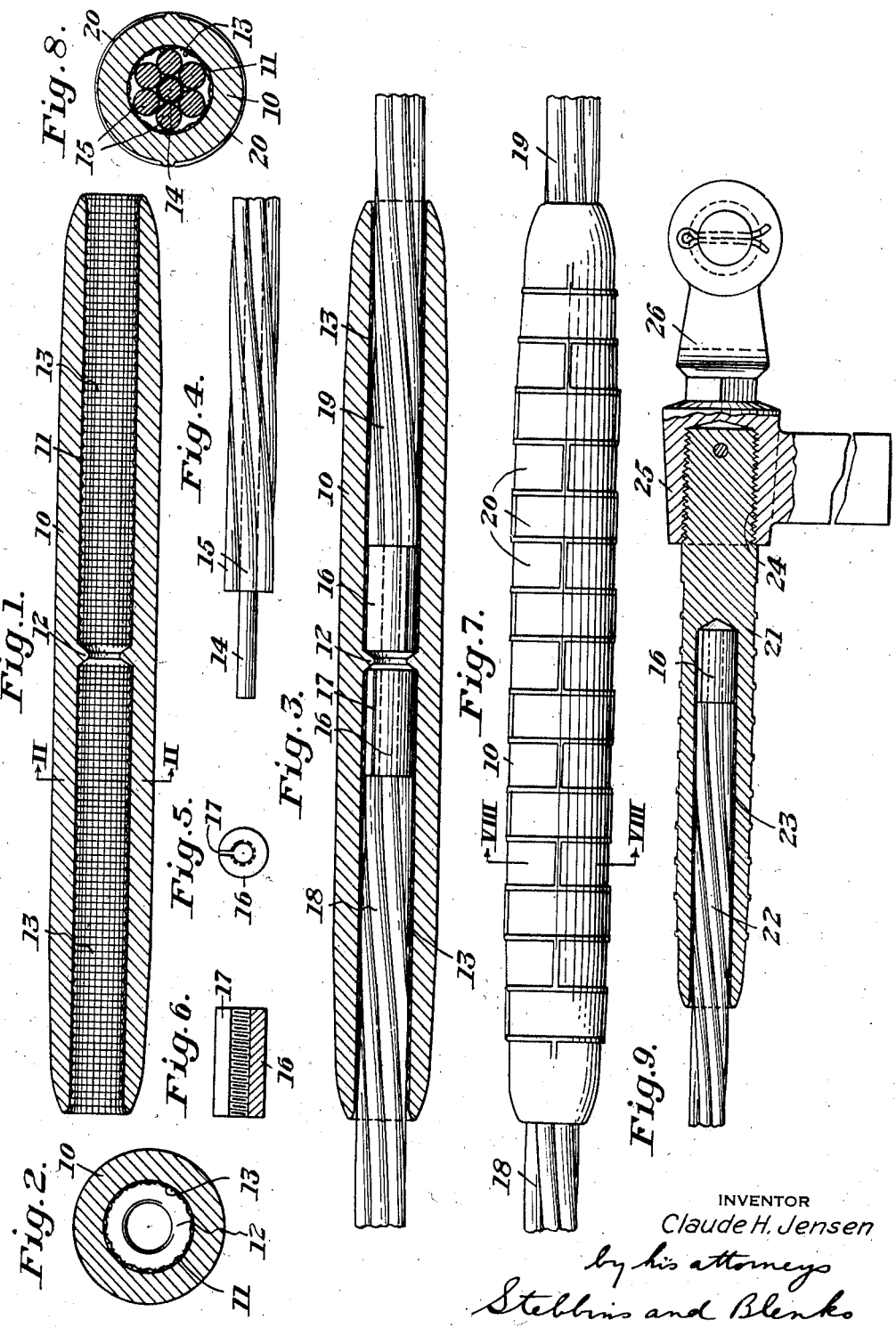
INVENTOR
Claude H. Jensen
by his attorneys
Stebbins and Blenko Patented July 29, 1941

2,251,189

UNITED STATES PATENT OFFICE 2,251,189

CABLE CONNECTOR

Claude H. Jensen, Pittsburgh, Pa., assignor to Copperweld Steel Company, Glassport, Pa., a corporation of Pennsylvania Application February 28, 1941, Serial No. 380,975

4 Claims. (Cl. 287—109)

This invention relates to a cable connector, i. e., a device for connecting two cable ends together or for connecting a single cable end to a dead-end fitting or the like.

So-called compression splicing sleeves have been used heretofore comprising a copper sleeve adapted to receive cable ends and to be deformed by a tool having compression jaws, into firm frictional engagement therewith. The present invention is an improvement over connectors of this type and the object thereof is to provide a stronger grip between the sleeve and cable ends.

In a preferred embodiment of the invention I utilize a connecting sleeve of copper or copper alloy having bores therein adapted to receive the ends of adjacent lengths of cable such as a stranded, transmission-line conductor. The bores in the sleeve are provided with a preformed lining tube adapted to bite into and form keys with the sleeve and cable ends when the former is compressed on the latter. The preformed lining tube may conveniently be of wire mesh, e. g., bronze. The strands of the mesh embed themselves to a considerable depth in the wall of the bore in the connector sleeve and in the surfaces of the cable ends, thereby providing effective keys tending to prevent the cable ends from pulling out of the sleeve.

A complete understanding of the invention may be obtained from the following detailed description with reference to the accompanying drawing illustrating a preferred embodiment and a modification. In the drawing Figure 1 is a longitudinal sectional view through a connector or splicing sleeve embodying the invention;

Figure 2 is a transverse section therethrough taken along the plane of line II—II of Figure 1;

Figure 3 is a view similar to Figure 1 showing the cable ends inserted in the connector sleeve;

Figure 4 is an elevation of the end of one of the cables prepared for receiving an inner sleeve on its center wire or core;

Figure 5 is an end view of the inner core;

Figure 6 is a longitudinal section therethrough;

Figure 7 is an elevation of the cable connector after it has been compressed onto the cable ends by application of a suitable tool to spaced portions of its length;

Figure 8 is a transverse sectional view taken along the plane of line VIII—VIII of Figure 7; and Figure 9 is a longitudinal section through a modified form of connecting sleeve adapted to secure a cable end to a dead-end fitting or the like.

Referring now in detail to the drawing, my connector comprises a tubular member or sleeve 10 of copper or other easily deformable metal. The sleeve 10 has a longitudinal bore 11 therethrough. An interior circumferential bead 12 midway of the length of the sleeve provides a stop to facilitate properly positioning cable ends in the bore. A preformed lining tube 13 is inserted in each end of the bore 11. The lining tube is adapted to form keys with the interior of the bore 11 and the conductor ends inserted therein on compression of the sleeve about the conductor ends. In a preferred embodiment, the lining tubes 13 are composed of wire mesh, although other forms such as perforated sheet metal or the like may be used. The mesh from which the lining tubes are formed is preferably woven from hard bronze wires or at least wires running in one direction are hard bronze. In the latter case, the lining tubes are so formed that the hard bronze wires are circumferential.

The lining tubes are preferably formed from flat mesh. They need not be accurately made and it is not necessary that the adjacent edges of the longitudinal joint be connected. The lining tubes may conveniently be secured in place by dipping the ends of the sleeve 10 with the lining tubes loosely disposed in the bore 11 into a solder pot. The mesh wires of the lining tubes adjacent the ends of the sleeve 10 are thus soldered to the latter.

If the cables to be connected by the connector have a copper-clad, steel, center wire or core such as that shown at 14, the ends of the outer or copper wires 15 are cut back as shown in Figure 4, so that an inner sleeve 16 may be placed on the extreme end of the core 14. The sleeve 16 is a relatively hard metal such as hard-drawn bronze and has a central bore therethrough which is tapped, serrated or otherwise formed to provide sharp edges for biting into the copper sheath on the core 14. The sleeve 16 is slotted longitudinally as at 17 to permit it to be collapsed slightly in order to grip the core 14 tightly.

When the cable ends to be connected, indicated at 18 and 19, have been prepared as illustrated in Figure 4 and inner sleeves 16 loosely disposed on the cores thereof, they are inserted in the ends of the sleeve 10 within the lining tubes 13. The connector is then ready for the application of a suitable compression tool whereby the sleeve 10 is deformed and compressed in order to obtain a tight grip on the cable ends.

Figure 7 shows the external appearance of the sleeve 10 after the application of the gripping jaws of the compression tool to spaced portions of the length thereof. As there illustrated, the exterior of the sleeve is actually contracted as at 20. This contraction of the sleeve about the lining tubes and cable ends causes the wires of the former to bite into the latter and into the interior of the bore 11 forming keys therewith, whereby the resistance to pulling out of the cable ends from the sleeve is greatly increased as compared to the strength of the joint obtained by splicing sleeves known heretofore. Inspection of the interior of the sleeve after compressing it and then opening it up shows that the mesh wires form indentations of considerable depth in both the interior of the sleeve bore and in the exterior surfaces of the cable ends.

In addition to embedding the lining tube in the interior of the connector sleeve and the exterior of the cable ends, the compression of the central portion of the sleeve 10 causes the inner sleeves 16 to contract about the core wires 14. The threads on the interior of the bores through the sleeve 16 bite into the copper sheath on the core wires and the exterior surfaces of the inner sleeves are indented by the wires of the mesh lining tubes in the same manner as the external surfaces of the cable ends 18 and 19. The function of the inner sleeves 16 is to transmit the tension to which the cable is subjected from the core wire of one cable end to the core wire of the other cable end through the sleeve 10. This is desirable because the core wires of a cable such as that shown in section in Figure 8 carry the greater portion of the tension load thereon and if a firm grip on the core wires were not obtained, the application of tension to the outer wires would cause them to elongate and slide along the core wires. The cutting back of the outer wires of the cable, as shown in Figure 4, and the use of inner sleeves 16 will not be necessary where the core wire 14 is of the same material as the outer wires 15.

Figure 9 shows a modification whereby the invention may be adapted to secure a cable end to a dead-end fitting, instead of to an adjoining cable end. As shown in Figure 9, a sleeve 21 has a bore adapted to receive a cable end 22 and the bore is provided with a preformed lining 23 similar to those shown at 13. The end of the sleeve 21 opposite that in which the bore for the cable end is formed is threaded as at 24 for cooperation with a tapped hole in the heads 25 of a clevis 26, or other form of coupling. The cable end 22 is also provided with an inner sleeve 16 as in Figure 3. The sleeve 21 shown in Figure 9 is applied and compressed in the manner already described and functions in the same way as the sleeve 10 to secure the cable end 22 to the clevis 26 or other suitable terminal fitting.

It will be apparent from the foregoing that the invention provides an improved cable connector or splicing sleeve of the compression type which exhibits greater resistance to pulling out of the cable ends than the connecting sleeves previously known. A further advantage of the invention is the low cost of the lining tube and the ease with which it may be inserted and secured in the bore through the sleeve.

Although I have illustrated but a preferred form and a single modification of the invention, it will be understood that changes in details may be made without departing from the spirit of the invention or the scope of the appended claims.

I claim:

1. A cable connector comprising a sleeve bored to receive the end of a cable, said sleeve being deformable into gripping engagement with said cable end, and a lining tube of wire mesh inserted in said bore, the wires of said mesh being adapted to bite into and form keys with said cable end and sleeve on radial compression of the latter.

2. A cable connector comprising a sleeve bored to receive the end of a cable, said sleeve being deformable into gripping engagement with said cable end, and a lining tube of wire mesh inserted in said bore, said mesh being composed of a metal harder than that of the sleeve or cable end.

3. A connector for stranded cables having a core, comprising an outer sleeve having a bore adapted to receive a cable end, an inner sleeve surrounding the end of the core wire or wires only of said cable and adapted to be inserted with the cable end into said bore, and a separately formed tubular lining in said bore adapted, on radial compression of said outer sleeve, to form keys with said outer sleeve, said inner sleeve and said cable end, said inner sleeve being compressed onto the cable core by the compression of the outer sleeve.

4. A cable connector comprising a sleeve bored to receive the end of a cable, said sleeve being deformable into gripping engagement with said cable end, and a preformed lining tube inserted in said bore and soldered to the sleeve at least adjacent the end thereof and adapted to be pressed into the cable end and sleeve on radial compression of the latter, forming keys therewith.

CLAUDE H. JENSEN.